June 23, 1970     H. MAHLO ET AL     3,517,204
METHOD AND APPARATUS FOR ASCERTAINING AND CONTROLLING THE
ANGULAR DEVIATION OF WEFT THREADS
IN MOVING WEBS OF FABRIC
Filed Dec. 1, 1967     7 Sheets-Sheet 1
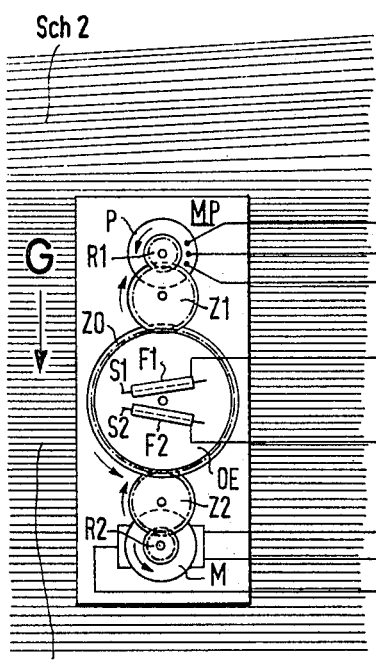
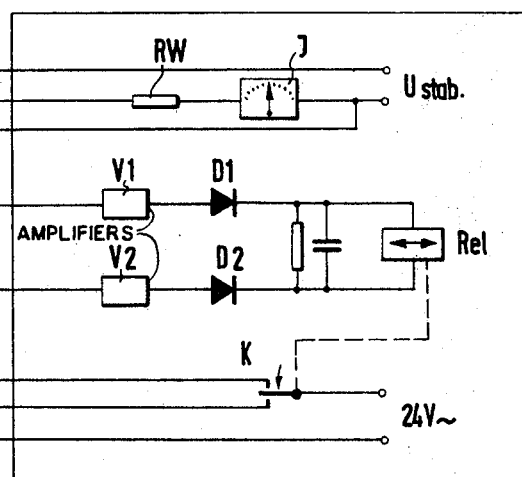
Fig.1
HEINZ MAHLO, KLAUS LANGE,
HELLMUT BECKSTEIN, GÜNTER SCHELLENBERGER United States Patent Office 3,517,204
Patented June 23, 1970

3,517,204
METHOD AND APPARATUS FOR ASCERTAINING AND CONTROLLING THE ANGULAR DEVIATION OF WEFT THREADS IN MOVING WEBS OF FABRIC
Heinz Mahlo, Saal (Danube), Klaus Peter Lange, Munich, Hellmut Beckstein, Regensburg, Guenter Schellenberger, Saal (Danube), Germany, assignors to Heinz Mahlo, Saal (Danube), Bavaria, Germany
Filed Dec. 1, 1967, Ser. No. 687,380
Int. Cl. G01n 21/32
U.S. Cl. 250—219                 20 Claims

ABSTRACT OF THE DISCLOSURE

According to the invention a light spot is produced on the fabric and a direction defining photo-electric scanner is rotated clockwise and counter clockwise above the spot to produce a signal which represents the amount or extent of the deviation of the weft threads of the fabric from a predetermined direction. The signal is used to control the rotational scanning movement of the scanner and for correcting the weft direction. A separate control voltage may be produced by a potentiometer by rotating its wiper contact in unison with the scanner. Such separate voltage may be used for said correcting of the weft direction.

The present invention relates to method and apparatus for ascertaining and controlling the angular deviation of weft threads in moving webs of fabric from a predetermined direction. It is necessary to determine the angular deviations of the weft threads, for example, where the fabric is coming out of a dryer and the direction of the weft threads needs correction, for example, for proper rolling up of the material.

German Pat. 1,109,636 discloses an apparatus for ascertaining the position of weft threads in moving webs of fabric and for controlling apparatus capable of straightening the weft threads. The known device comprises at least one photocell and a light source as well as measuring and control means which are responsive to the voltage amplitude of the signal produced by the photocell. Such voltage amplitude is dependent on the angle between the weft threads and the photocell and it reaches its maximum value when the photocell and the weft threads extend in parallel to each other. This known device is capable of ascertaining a deviation of the weft thread direction and to generate a signal in response to the direction of deviation (positive or negative deviation). However, the amount or extent of the deviation cannot be ascertained by the known apparatus.

OBJECTS

In view of the above it is an object of the invention to generate a control signal which is representative of the deviation of said weft threads in a web of fabric; stated differently, the control signal shall be a direct measure of the amount or extent of the angular deviation in one or the other direction out of a home or zero position.

Yet another object of the invention is to provide a follow up scanning apparatus, particularly a photo-electric scanner which is capable of defining a predetermined direction or position and to follow the deviations of the weft threads from the predetermined position in one or the opposite direction.

A further object is to provide a direction defining rotational photoelectric scanner the rotational movement of which represents a measure of the angular deviation of the weft threads in a fabric.

It is another object to scan a web of a moving fabric in two or more places whereby the follow up of a scanning device is to be controlled by a signal defining such deviations or by a maximum value of such signal.

Another object is to produce at least one voltage signal which is proportional to the said angular deviation in a positive or negative direction away from a home or zero position.

It is yet another object to guide or control the scanner so that it follows the deviations in a swinging back and forth movement.

Yet another object is to generate such deviation proportional control signals independently of the nature or type of the fabric.

Yet another object is to provide control means which follow the control signal without appreciable delay between the ascertaining of an angular deviation of the weft threads and the corresponding follow up motion of the scanning device.

SUMMARY

According to the invention there is provided in a method for ascertaining and controlling the angular deviation of weft threads in moving webs of fabric from a predetermined position, wherein the fabric is illuminated by a light source and moved past a scanning station to be scanned by photo-electric means, the improvement comprising the steps of forming a light spot on the fabric, rotationally scanning the light spot by direction defining photo-electric scanning means for generating an angular deviation representing signal which is a measure of the amount of the positive and negative deviation away from a zero position, and using the angular deviation signal for controlling the rotational movement of the scanning means to follow said angular deviation.

According to the invention there is further provided an apparatus for ascertaining and controlling the angular deviation of weft threads in moving webs of fabric from a predetermined position, comprising light source means for illuminating the fabric to produce a light spot thereon, a rotatably supported scanning means, photoelectric sensing means mounted on said scanning means, a drive means operatively connected to said scanning means for rotating the scanning means back and forth in clockwise and counter clockwise direction, control means electrically connected to said photo-electric sensing means for energizing said drive means, and voltage generating means responsive to the rotational position of said scanning means for producing a control voltage which represents the angular position of said scanning means relative to said weft threads for controlling the position of said weft threads.

The apparatus according to the invention comprises a photo-electric device and an electrical motor which drives the photo-electric device and which is controlled by means of photocells. The motor causes a follow up of the photo-electric device relative to the weft thread deviation so that either the photocells take up a position which is symmetrical relative to the position of the weft threads or the photocell is controlled by the motor in such a manner that it will tend to take up a position in which to produce its maximum output voltage.

In one embodiment of the apparatus according to the invention the photoelectric device comprises two slits which are arranged to form a V-shape.

In this embodiment the photo-electric device may comprise two photocells arranged above said slits. If now the weft threads deviate from a normal or zero position the two photocells will receive different amounts of light so that a different voltage will be produced by each photocell and the follow up of the photo-electric device is controlled by a resulting signal which is produced by differentially combining the two signals generated by the photocells.

In yet another embodiment of the invention a single photocell is mounted above the slit and a swinging member is provided for directing the light onto the photocell. The swinging member may be a pivotable mirror which is arranged above a line-shaped or longitudinal photocell. It is also possible to provide a swingable shutter instead of the pivotable mirror. In this instance the swingable shutter would cooperate with a photocell having an area surface rather than a longitudinal extension. Due to the swinging movement of the shutter the photocell will receive alternately different amounts of light from the two slits and if deviations of the weft threads from the zero position are present the photo-electric device can again be controlled to follow up such deviations.

In yet another embodiment of the invention the photo-electric scanning device comprises but one photocell and but one slit which are movable in unison back and forth in a swinging movement. In this manner a given surface area of the fabric is scanned and the position of the weft threads is ascertained in a plurality of positions. In this instance a maximum signal is generated and such signal is used for controlling the follow up movement of the photo-electric device.

In yet another embodiment of the invention the photo-electric scanning device comprises a photocell and a slit and the entire scanning device is swingable back and forth whereby a combination of the follow up motion and a back and forth search motion is accomplished. This has the advantage that a surprising, simple structure may be employed for the scanning device and for the moving means.

It is possible to employ the present method and apparatus regardless whether light passes through the fabric or whether it is reflected by the fabric. In both instances it is possible ot ascertain the angular deviation of the weft threads from a zero or home position. However, preferably the signal representing such angular deviations is generated from light which passes through fabric. In this instance the photo-electric scanning device and the light source are arranged on opposite sides of the fabric. On the other hand, where the apparatus is to operate in response to light reflected by the fabric, it is possible to employ two photocells which are arranged in an angular position relative to each other whereby the angular position is such that the photocells are oriented toward the light spot on the fabric.

It is yet another feature of the invention that a time delay compensating network is provided in a control circuit arrangement which controls said electric motor of the scanning device. In this manner delay between the ascertaining of an angular deviation and the taking up of a correct position by the scanning device is avoided.

In order that the invention may be clearly understood it will now be described, by way of example, with reference to the accompanying drawings; wherein:

FIG. 1 illustrates a first embodiment of the invention wherein the scanning device comprises two photocells and two slits;

Figure 8:
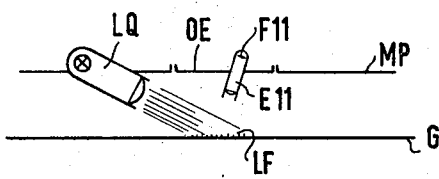
FIG. 8 illustrates a side view of a fourth embodiment according to the invention.
Figure 10:
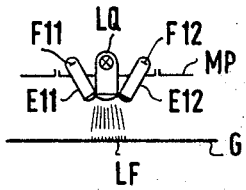
Figure 9:
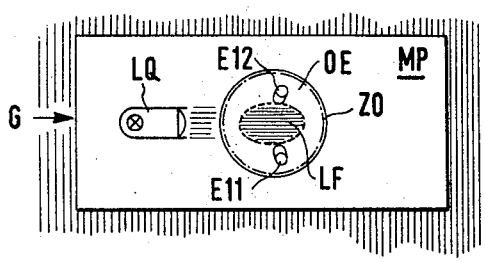
FIG. 9 is a top view of the embodiment according to FIG. 8.
Figure 11:
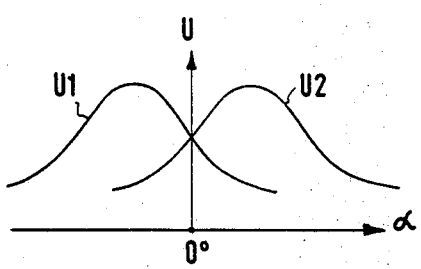
Figure 12:
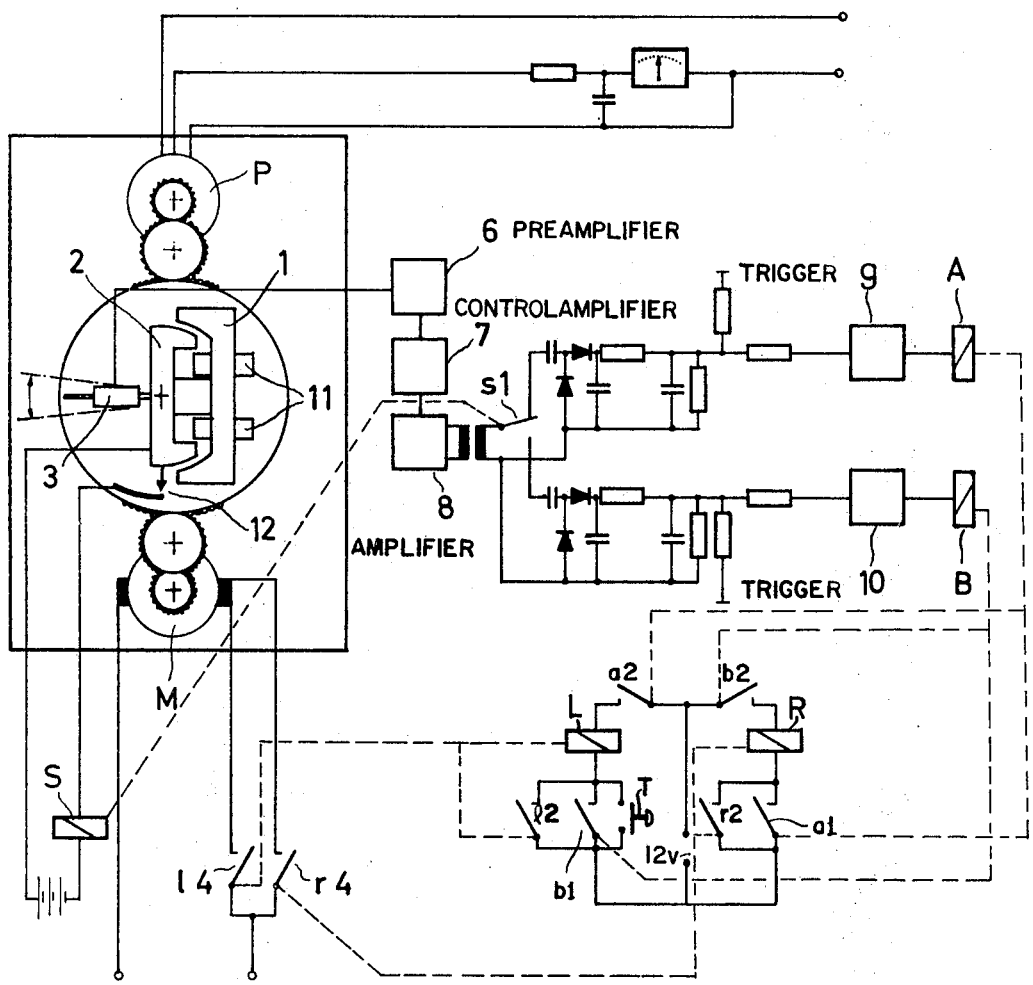

FIG. 10 illustratives a front view of the embodiment according to FIGS. 8 and 9;

FIG. 11 is a diagram illustrating the control input voltage curves as a function of an angle by which the weft thread deviates from a given direction in the device as illustrated in FIGS. 8, 9 and 10; and FIG. 12 shows a further embodiment of the invention comprising a scanning device with a single photocell attached to an oscillating member.

In the drawings dashed lines between relays and their respective contacts indicate that such contacts are actuated by the relay to which the contact is linked by its dashed line.

The apparatus according to FIGS. 1 to 5 comprises a light source (not shown) which is arranged underneath a web of fabric G. Such light source irradiates the fabric by means of parallel rays of light. The light emitting surface of the light source is large enough so that the entire area covered by the photo-electric device OE is illuminated. The photo-electric device OE is rotatably supported and comprises around its outer rim a ring gear ZO. The photo-electric device OE is rotatable by means of a motor M which drives the photo-electric device in clockwise or counter clockwise direction through a pinion R2 and a gear wheel Z2. The particular position of the photo-electric device OE is transmitted to a potetiometer P by means of a pinion R1 and a gear wheel Z1. The pinion R1 is arranged on the shaft of a wiper contact of the potentiometer and is driven by the gear wheel Z1 which in turn meshes with the ring gear ZO of the photo-electric device. The fabric web G advances in the direction of the arrow as shown. The weft threads Sch 1 have initially a correct or predetermined position. However, the weft threads in the area designated Sch 2 above the upper end of a mounting plate MP deviate from the desired position.

According to the embodiment of FIG. 1, the photo-electric device OE includes a circular disk surrounded by an upstanding rim. In the bottom of the disk there are provided two slits S1 and S2 arranged to form a V-shape. The width of the slits may, for example, be several tneth of a millimeter and their length may, for example, be two centimeters. Above slits S1 and S2 there are mounted in fixed position two photocells F1 and F2. As long as the weft threads of the fabric G are in their normal position as shown at Sch 1, both photocells F1 and F2 will produce alternating voltage signals of equal size which indicates that the photo-electric scanning device takes up its home or normal position.

Each signal is fed to its rsepective amplifier V1 or V2 in a control device or circuit. The amplified signals are rectified in diodes D1 and D2 and the two DC signals are fed to a polarized relay Rel. Since both signals are of equal size and since they have been amplified by means of the equal gain amplifiers V1 and V2, and since they are of opposite polarity the resulting voltage will be equal to zero. Accordingly, the polarized relay Rel will not be energized. Therefore, a three position contact K which is operated by the polarized relay Rel will remain in its shown center position whereby a motor M will not be operated.

If now the fabric G has moved on so that the deviating weft threads Sch 2 appear underneath the photo-electric device OE, different signals will be produced because the weft threads will extend, due to their deviation substantially in parallel to slit S1. As a result the signal generated by the photocell F1 will increase whereas the signal generated by photocell F2 will decrease because in the latter instance the deviating weft threads will extent at an even larger angle relative to the direction of slit S2. Upon amplification, rectification and differentially combining the two resulting signals the signal generated by photocell F1 will exceed the signal generated by photocell F2 so that the polarized relay R*el* will be energized to actuate its contact K in the direction represented by the small arrow above the contact K. Upon closure of contact K in the direction indicated, the motor M will rotate in a direction shown by the arrow in the lower left hand portion in the circle representing the motor M. Such rotation will be transmitted through the pinion R2 and the gear wheel Z2 until the bisector of the angle defined by the direction of the two slits S1 and S2 extends in parallel to the weft threads. When this happens the two signals generated by the photocells F1 and F2 are again of equal amplitude so that upon amplification, rectification and differential combination of the two signals they will cancel each other and the polarized relay R*el* will be de-energized whereby the three position contact K will return to its zero position. As a result the motor will stop.

The rotation of the photo-electric device OE is simultaneously transmitted via the gear wheel Z1 and the pinion R1 to the potentiometer P whereby the wiper contact will have been moved to a different position so that now a smaller current will flow through a resistor RW and the indicating instrument in the control circuit. Accordingly, the instrument J which is connected to a stabilized voltage U S*tab* will indicate the position of the potentiometer wiper which position, due to the mentioned gears, has a mechanically fixed relationship to the rotational position of the photo-electric device. Accordingly, the angular deviation of the weft threads will be directly indicated. By means of the voltage which is fed to the instrument J it is now possible to control apparatus for straightening the weft threads.

Figure 2:
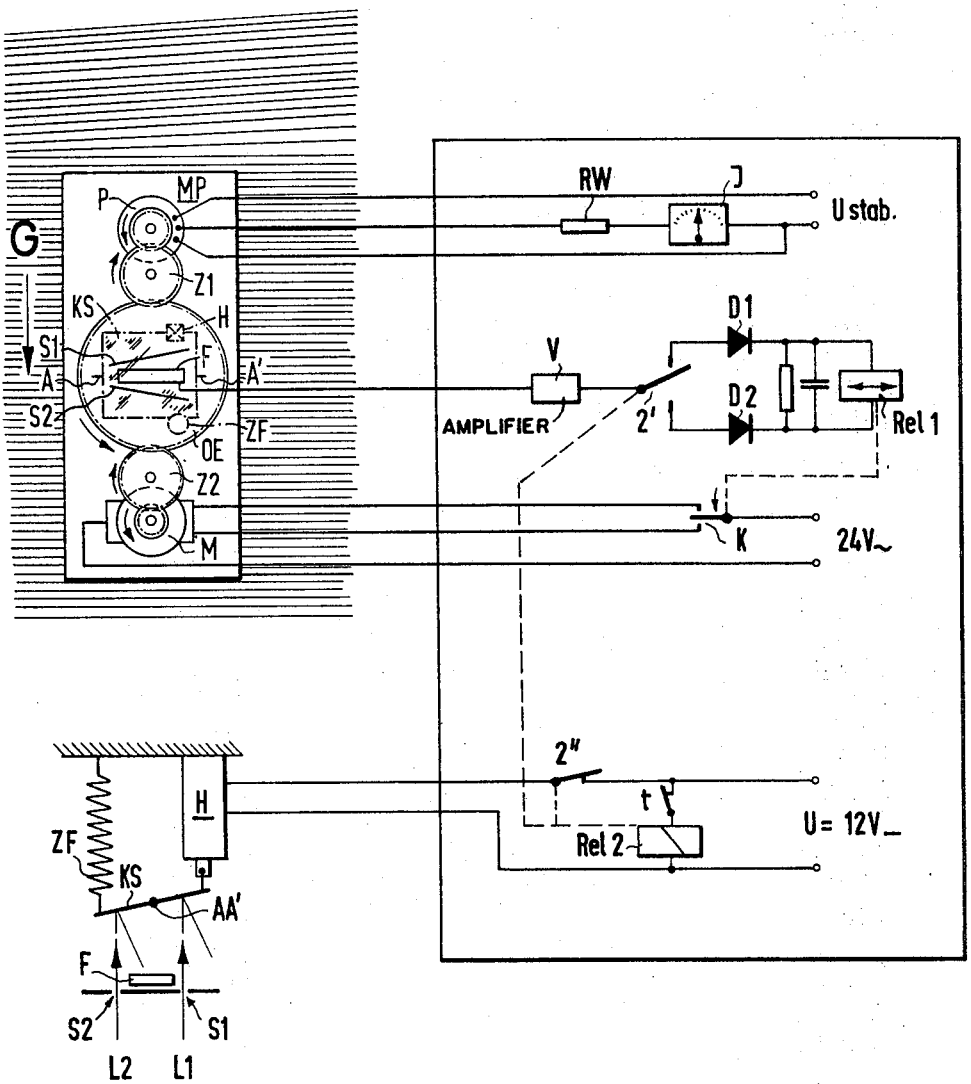
FIG. 2 illustrates a modification of the embodiment of FIG. 1 comprising a single photocell, two slits and a tiltable mirror.

According to FIG. 2 the photo-electric device OE also comprises a circular disk having an upstanding rim and a bottom which comprises, as in FIG. 1, two slits S1 and S2. However, in the embodiment of FIG. 2 only one photocell F is used and such photocell is arranged in the center between the two slits S1 and S2. Above the slits S1 and S2 and above the photocell F there is arranged a tiltable mirror KS. The mirror is pivotally supported on the upstanding rim of the disk and its tilting taken place about an axis AA'.

One edge of the tiltable mirror KS is connected to a solenoid or magnet H while its opposite edge is connected to a tension spring ZF. The tilting mirror KS is therefore mounted in such a manner that it can take up two well defined positions. If the magnet H is energized it will pull up the right hand edge of the mirror as shown in the lower left hand corner of FIG. 2. However, if the magnet H is deenergized, the force of the tension spring ZF will prevail so that the tilting mirror KS will tilt in its opposite position just like a see-saw. The magnet H is controlled by timing means (not shown) which energize a relay (not shown). If such relay is energized it will close its contact "t" thereby causing the energization of relay R*el* 2. The energization of relay R*el* 2 will cause the closure of contact 2″ as a result, the magnet H will be energized. If the output relay of the timing means is de-energized, the contact "t" will be opened and relay R*el* 2 will also be de-energized whereby the contact 2″ is opened and the magnet H is accordingly de-energized.

The evaluation and control of the motor M and of any weft straightening means is accomplished similarly as in FIG. 1 by means of the potentiometer P and the instrument J.

Relay R*el* 2 has a further contact 2' which is flipped back and forth between its upper and lower position in the same rhythm in which the magnet H is energized and de-energized. Thus, contact 2' feeds the signal generated by the photocell F and amplified by the amplifier V, either to the upper diode D1 or to the lower diode D. If the signal generated by the photocell F is continously of the same magnitude or ampitulde but opposite polarity, independently of the position of the tiltable mirror KS, then the output voltage of the rectifiers D1 and D2 will be zero since the signals cancel each other. As a result the polarized relay R*el* 1 will be de-energized and the motor M will not be operated.

However, if now a web portion arrives the weft threads of which deviate from a predetermined direction as shown at S*ch* 2, then the photocell F will generate different signals at different times. The signal will be larger when the light beam impinges upon photocell F through the slit S1, while a signal of smaller magnitude will be generated at times when the light impinges upon photocell F through slit S2, or vice versa depending upon the direction of deviation of the weft threads. As a result, the polarized relay R*el* 1 is energized and its contact K will switch to its upper closed position indicated by the small arrow whereby a voltage is supplied to the motor K so that its rotor will rotate in counter clockwise direction. Simultaneouly, the photo-electric device OE will rotate until the bisector of the angles defined by slits S1 and S2 extends again in parallel to the weft threads.

Figure 3:
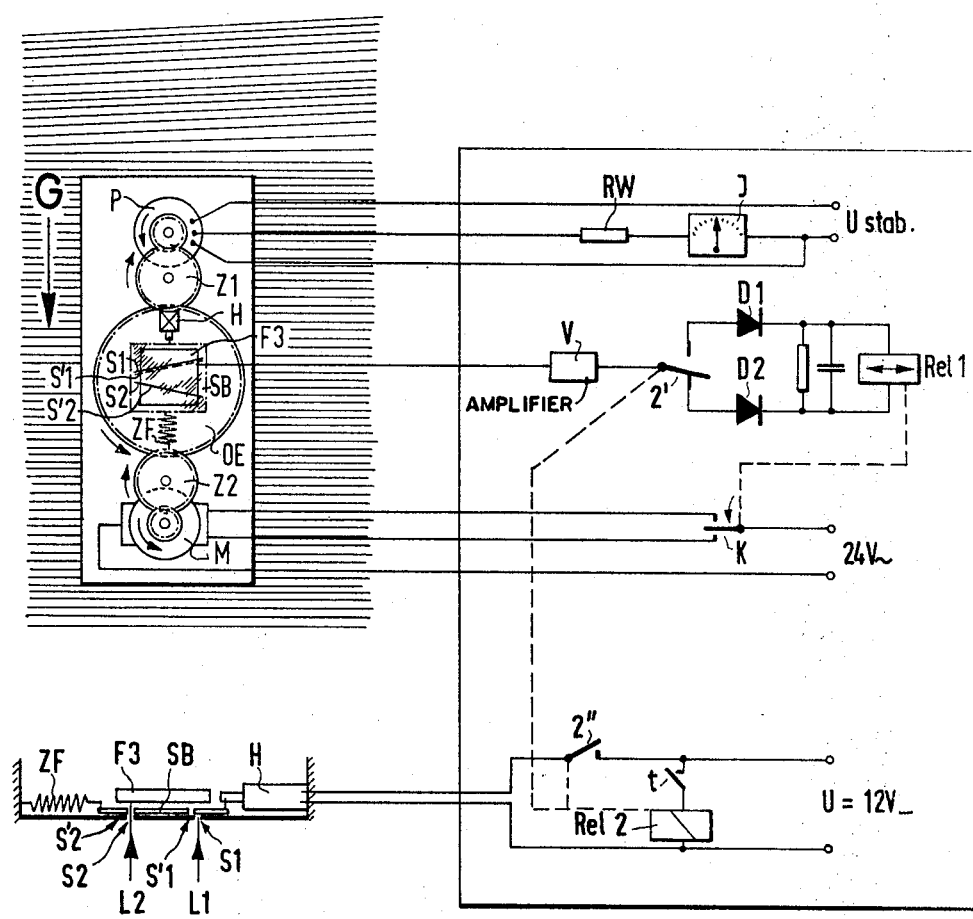
FIG. 3 shows a further modification of the first embodiment comprising a swingable shutter.

In the embodiment illustrated in FIG. 3 a photocell F3 is employed which has a surface area large enough to cover the slit S1 as well as the slit S2. An oscillating shutter SB is movable back and forth by means of the tension spring ZF and the magnet or solenoid H depending upon whether the force of the magnet H overcomes that of the tension spring ZF when the magnet H is energized.

The oscillating shutter SB has two slits S'1 and S'2 which extend in parallel to the slits S1 and S2 of the photo-electric device OE. If the magnet H is de-energized when contact 2″ is open, a light beam L2 will pass through slits S2 and S'2 as shown because the spring ZF will pull the shutter to the left.

However, if the magnet H is energized when contact 2″ is closed then the shutter SB will be pulled to the right and a light beam L1 will pass through the slits S1 and S'1 to impinge upon the photocell F3. Simultaneously the light beam L2 will be prevented from passing through both slits S2 and S'2.

Figure 4:
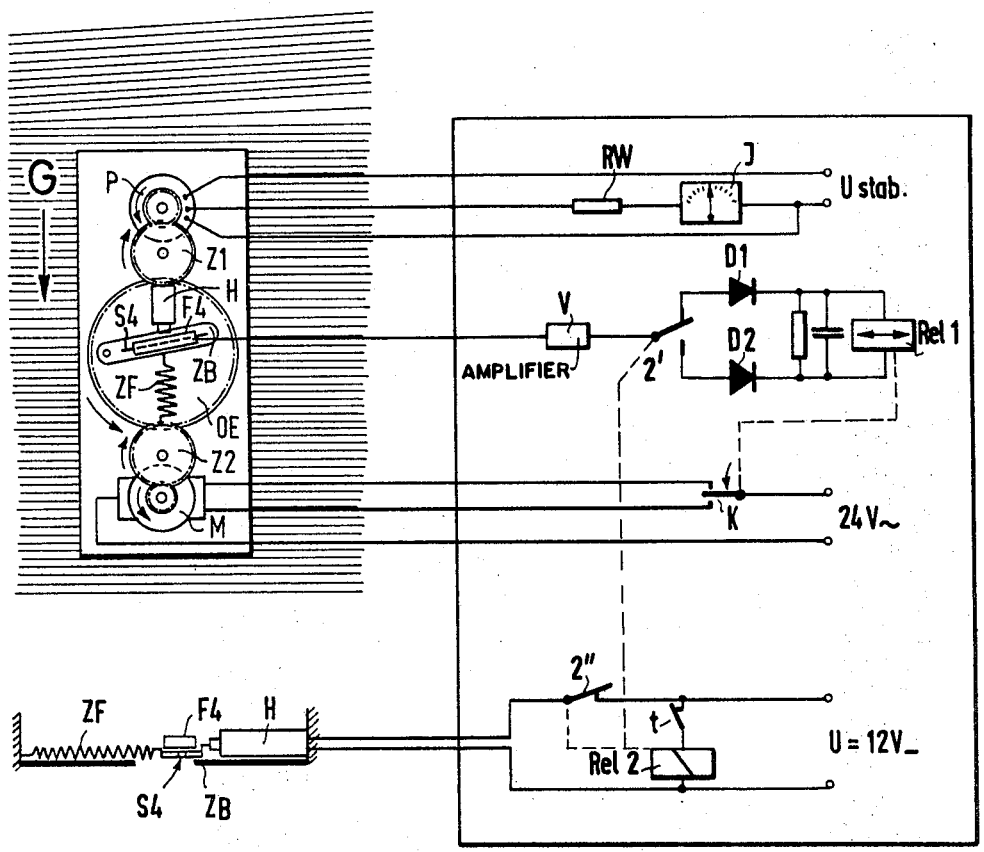
FIG. 4 represents a further embodiment on the invention comprising a single photocell and a slit both of which are adapted for swinging back and forth.

The embodiment of FIG. 4 includes a modified photo-electric device OE although the signal evaluation is accomplished in the same manner as in FIGS. 2 and 3. The photo-electric device of FIG. 4 comprises instead of two slits, a larger aperture which may have the shape of a sector. Above the sector there is arranged a movable optical system comprising a swingable shutter ZB in the form of a bar the left hand end of which is pivotally mounted on the disk of the scanning device OE. The shutter bar ZB has a slit S4 and carries a photocell F4 arranged above the slit S4.

The optical system can be pulled into one of its two end positions by energizing the magnet H. Upon de-energization of the magnet H the tension spring ZF will pull the optical system into its other end position. In this manner it is possible to achieve the same result as has been achieved by means of a tiltable mirror in FIG. 2 and by means of an oscillating shutter SB in FIG. 3. The advantage of this arrangement is that only a single slit S4 is necessary.

Figure 5:
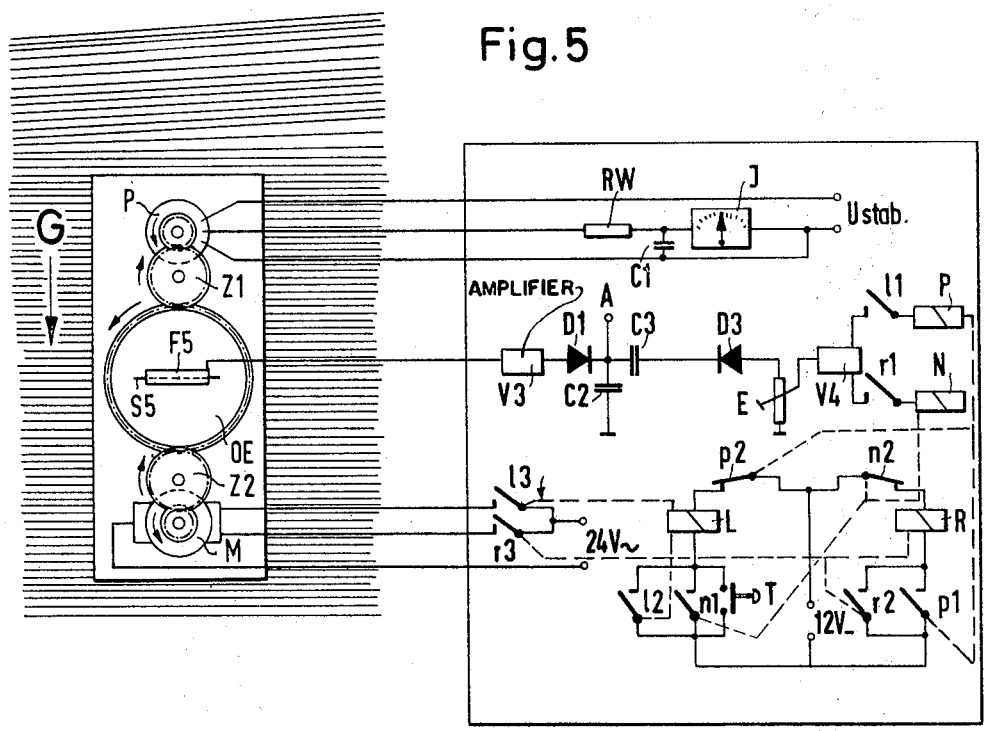
FIG. 5 is illustrative of a third embodiment of the invention in which a photo-electric device comprising a single photocell and a single slit is swingable back and forth.

The embodiment of FIG. 5 comprises a photo-electric device OE having but one slit S5 above which is arranged a photocell F5. This single photocell F5 is to be moved by rotating the photo-electric device in such a manner that the photocell F5 will always swing back and forth about the "signal maximum."

Figure 6:
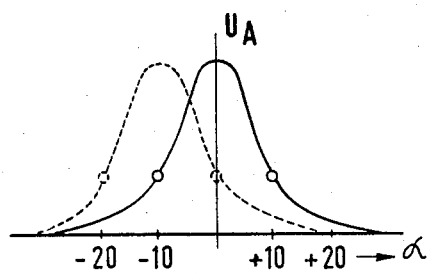
FIG. 6 illustrates the voltage of the photocell as a function of the angle by which the weft threads deviate from a given direction as ascertained by an apparatus as shown in the embodiment of FIG. 5.

FIG. 6 illustrates what is meant by "signal maximum." FIG. 6 shows the voltage UA generated by the photocell as a function of an angle $\alpha$ $$UA = f(\alpha)$$

wherein the angle $\alpha$ is a measure of the deviation of the direction or position of the weft threads from a given direction. The curve of FIG. 6 shows generally what signal voltage may be derived if a fabric having differently deviating weft threads passes underneath a photoelectric device taking up its normal or home position. For extreme deviations expressed in positive and negative deviation angles the signal amplitude is approximately zero. However, if the fabric is in its normal position the amplitude of the generated signal will have its maximum.

It has now been found that an instantaneous amplitude value in and of itself is not sufficient to determine whether a maximum or some deviation less than maximum is involved. A maximum value can be recognized only in that subsequent to indicating such maximum value, decreasing values are shown upon advancing the photo-electric device in the same direction.

Let us assume that the initial position of the photoelectric device OE is such that it corresponds approximately to a deviation angles of +25°. If now a switch member T in the electrical control circuit arrangement of FIG. 5 is closed, a relay L will be energized thereby closing its contact 13 for energizing the motor M which will start to rotate in counter clockwise direction as shown by the arrow. Simultaneously, the photo-electric device OE will be driven in counter clockwise direction as shown. Upon energizing the relay L its holding contact 12 will be closed and its contact 11 will connect a relay P to a direct current amplifier V4. As long as the photo-electric device OE is rotating the generated signal will have an almost zero value at +20° and will increase as shown at +10° to reach its maximum value "U max" at 0° whereupon it decreases. This voltage curve is measurable at terminal A in the circuit of FIG. 5. A diode D3 is arranged in such a manner that it will conduct when the amplitude of the signal after passing its maximum value decreases or becomes "negative." Thus the decreasing amplitude will pass through a capacitor C3 and diode D3 to an adjusting potentiometer E. The voltage appearing at the wiper contact of the potentiometer E is applied to the input of the DC amplifier V4 and, since contact 11 is closed relay P will be energized. A contact $p1$ of relay P will close and thereby energize a relay R. A contact $p2$ will open to de-energize relay I, whereby its contact 13 will be opened while relay R closes its own holding circuit through its contact $r2$. Contact $r1$ will also be closed to energize a relay N. Further, contact $r3$ will be closed as well so that motor M will now rotate in a clockwise direction. This will cause a rotation of the photo-electric device OE in a direction from, for example, —10° in a positive direction. Accordingly, the voltage appearing at the probe terminal. A begins to rise until at 0°, it reaches its maximum. Whereafter the voltage decreases again. Such decrease causes the diode D3 to conduct whereby the potentiometer E is again supplied with a voltage which is amplified in DC amplifier V4 to energize relay N through the closed contact $r1$. Relay N energizes through its contact $n1$ the relay I, and by opening its contact $n2$ relay N de-energizes relay R whereby the sequence of the just described operational steps is repeated.

If the circuit for the indicating instrument J would be embodied just as in the preceeding example, then the pointer which normally takes up a center position on the scale of the instrument J, would swing back and forth between positive and negative values due to the continuous back and forth rotation of the photo-electric device. In order to reduce such an effect, a capacitor C1 is connected as shown in FIG. 5. This capacitor C1 functions as a damping capacitor whereby the motion of the pointer of the instrument J is slowed down in such a manner that the indicated value remains constant for all practical purposes.

If now weft threads arrive which deviate from the given normal direction or position, then the maximum will appear at another position as shown in FIG. 6 by the dashed curve. If the motor M was just rotating in counter clockwise direction, which means from positive to negative deviation angles, it will have to run for a somewhat longer duration until at the terminal A a decreasing instantaneous amplitude value occurs which will reverse the direction of rotation of the motor M. If this deviation continuous for some time, the photo-electric device OE would swing back and forth in rotational movements about the deviating angle of —10°. Without the damping capacitor C1 the pointer of the instrument J would swing back and forth correspondingly about the —10° value. However, the capacitor C1 prevents such swinging pointer movement. On the other hand, if the photo-electric device were to rotate in counterclockwise direction it would not have to continue to rotate in such direction as long as before until reversal for rotation in the opposite direction is effected.

If suddenly very large deviations should occur, then the signal voltage at terminal A would decrease rapidly and the rotation in the opposite direction would be switched-on. If the maximum value should be "lost" due to such instantaneous reversal, the motor M will rotate the photo-electric device to its end position, for example, at +25° or —25°. A searching device (not shown) may then be switched-on which will control the "searching" movement of the photo-electric device until it is "locked" again to the maximum instantaneous value.

The embodiment described above with reference to FIG. 1 makes it possible to indicate the true or actual angular position of the weft threads. The voltage which is indicated by the instrument J may also be used for energizing a controlling means. In this connection the following should be noted. As soon as a deviation appears in front of the optical device the signal will be generated which causes the energization of the polarized relay Rel. The contact K of this relay will then start the motor M. Only when the motor has rotated the optical device OE sufficiently so that the bisector of the angle between the two photocells F1 and F2 extends in a direction parallel to the direction of the weft threads, will the wiper contact of the potentiometer P have reached its proper position and the angular position will be ascertainable from the instrument J.

Inherent in the just mentioned steps is a delay between the occurrence of the deviation of the weft threads and the instant when the optical device takes up its proper position. This applies also to the adjustment of the relay P. Such delay might not be desirable for a proper control because any control means can respond only fully when the voltage which corresponds to the deviation is fully available at the potentiometer wiper contact.

Figure 7:
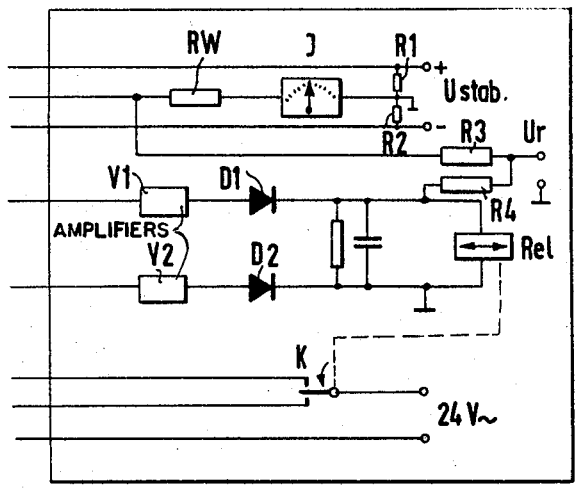
FIG. 7 illustrates a particular embodiment of the output circuit of a control device.

FIG. 7 illustrates a circuit arrangement in which the above mentioned delay will be avoided by means of a particular control voltage output circuit. In this circuit arrangement there are shown two resistors R1 and R2 connected across the positive and negative output terminal of the stabilized voltage source Ustab. These resistors are of equal value. The junction between the two resistors is connected to ground potential. As in FIG. 1, the indicating instrument J is energized by the signal appearing at the wiper contact of the potentiometer P and supplied to the instrument through a resistor RW. This instrument has a mechanical zero indication which is positioned in the center of its scale. If now a positive or negative deviation occurs, there will simultaneously occur a positive or negative voltage across the instrument as well as between the potentiometer wiper contact and ground. The voltage for energizing a control means is now obtained through a decoupling resistor R3 and not directly from the wiper contact of the potentiometer P. A voltage UR is available between the decoupling resistor R3 and the line connecting to the control means input. One end of the relay coil of relay Rel is connected to ground potential while the other end of such relay coil is now connected either to a zero voltage if no deviation occurs, or to a positive voltage if a positive deviation relative to the instantaneous position of the optical device has occurred, or to a negative voltage if a negative deviation has occurred. A portion of such voltage is supplied through a further decoupling resistor R4 to the control output.

The above circuit arrangement, thus, in effect provides a "lead" which compensates for an inherent delay. As long as the relay Rel is de-energized no control voltage will be supplied. However, as soon as a deviating fabric moves past the optical device and the motor is just starting to run, the voltage appearing across the relay Rel will also be supplied to the control output. If now, the motor due to the energized relay has been running long enough so that the optical device has again reached a position parallel to the weft threads, the potentiometer will provide a voltage corresponding to the true deviation angle while the relay itself will be de-energized and so that no contribution to the control voltage will be made through resistor R4. Accordingly, it is possible by means of this circuit arrangement to give, in a sense, a "lead" to the control means immediately upon the occurrence of a deviation as long as the motor is still running in an effort to bring the optical device in proper position. The circuit arrangement shown in FIG. 7 and described with particular reference to FIG. 1 for increasing the response time of the control means, is in general also applicable to the arrangements according to FIGS. 2, 3 and 4.

According to the embodiments shown in FIGS. 8, 9 and 10 the optical device OE comprises two photo sensitive receivers E11 and E12. A light source LQ is mounted on the mounting plate MP on the same side of the fabric as the photo sensitive receivers. The optical device, as in the previous embodiments, comprises a rim with the gear ZO which meshed with the gears which drive the motor and the potentiometer just as in the other embodiments of FIGS. 1 to 5. The light source LQ directs parallel light beams downwardly so that the parallel light will impinge upon the area of the fabric at an angle relative to the horizontal in which the fabric G travels. Thus the illuminated light spot LF is produced. The two receivers E11 and E12 each of which comprises a respective photocell F11 and F12, are arranged at an angle relative to each other and relative to the illuminated spot to view such spot. Since the receivers are arranged in register with each other relative to a straight weft thread, only receiver E11 is seen in FIG. 8. FIG. 10 shows that the two receivers E11 and E12 are also oriented laterally and at an angle relative to the illuminated spot.

The apparatus according to FIGS. 8, 9 and 10 functions as follows. If a fabric having straight weft threads is located or moved underneath the optical device and if the optical device is roated from a negative angle through zero to a positive angle then the two photocells F11 and F12 will generate the corresponding DC voltages U1 and U2 as is shown in FIG. 11. The same voltage curves may also be obtained if the optical device is maintained in its zero position while the deviation of the fabric underneath is varied between narrow upper and lower values, for example, ±15°. On the basis of such experimentally obtained values it is now possible to differentially combine the two voltages generated by photocells F11 and F12. The resulting voltage may be amplified and used for energizing a relay as described above. Accordingly, the polarized relay can, just as in the embodiments of FIGS. 1 to 5, be used to control the motor M until the optical device is arranged in parallel relative to the weft threads of the fabric.

Where two photocells are used it is possible that deviations might occur due to the fact that different photocells might have slightly different characteristics. Therefore, it would be possible similarly, as shown in FIG. 2, to use instead of the two photocells F11 and F12 mirrors which swing in push-pull fashion to reflect the light impinging upon the mirrors toward a single photocell which would be common for both receivers. It would also be possible, as in FIG. 3, to use a photocell of sufficient surface area if alternately one or the other receiver is masked. As in FIG. 4, it would be possible to arrange the photocell so that it may be switched alternately from the illuminated spot for receiver E11 to the illuminated spot for receiver E12. Further, since the voltage curves shown in FIG. 11 are substantially similar to the curves shown in FIG. 6, it is also possible to use the scanning method illustrated in connection with FIG. 6, if instead of a longitudinal photocell a photocell of larger surface area is employed.

FIG. 12 illustrates an embodiment of the invention wherein a photocell 3 is mounted on an armature 2 of a self-excited, oscillating driver 1 comprising energizing windings 11. The photocell 3 is arranged to oscillate above the slit in the disk to scan a sector of the disk which is driven by the motor M as in the other embodiments described above.

A switch 12 is mounted partially on the disk and partially to said armature 2. The switch is so adjusted that it will close precisely in the center position of the armature 2 relative to the slit in the disk and relative to the back and forth oscillations of the armature 2. Thus, switch 12 will open and close an energizing circuit for a relay S in response to the oscillating movements of the armature 2 whereby said relay S will be energized during the movement of the oscillating armature 2 in one direction away from and toward its center position. The relay S will be de-energized during the movement of the oscillating armature in the other direction away from and toward its center position. Thus, the relay S will be energized during one half of a full back and forth cycle of the armature 2 and will be de-energized during the other half of such cycle.

The signal generated by the photocell 3 is fed through a preamplifier 6, a control amplifier 7 and a further amplifier 8 to the control means via a contact $s1$ which is operated by the above mentioned relay S. The control means comprise two signal analyzing channels including signal rectifying and smoothing members as well as trigger circuits 9 and 10. The trigger circuit 9 energizes a relay A in one signal channel whereas the trigger circuit 10 energizes a relay B in the other signal channel. Relays A and B operate their respective contacts $a$ and $b$ which open and close energizing circuits for relays R and L arranged in a circuit corresponding to that described in connection with FIG. 5. Relays L and R operate with their respective contacts 14 and $r4$ to energize the motor M for rotation in one or the other direction also as described above.

The switch 12 could, for example, be a photo-electric switch wherein a light beam scans back and forth over a switch member one half of which is photo sensitive while the other half is not so sensitive. In all described embodiments, optical lenses may be arranged in front of the slits and/or photocells.

It is to be understood that the invention is not limited to the particular embodiments and features described and shown but also comprises any modification and equivalents within the scope of the appended claims.

What is claimed is:

1. In a method for ascertaining and controlling the angular deviation of weft threads in moving webs of fabric from a predetermined direction, wherein the fabric is illuminated by a light source and moved past a scanning station in which the moving fabric is scanned by photo-electric direction defining means, the improvement comprising the steps of:
   (a) forming a light spot on the fabric,
   (b) rotationally scanning the light spot by said direction defining photo-electric scanning means for generating an angular deviation representing signal which is proportional to the amount of the positive and negative angular deviation away from the predetermined direction, and
   (c) continuously moving said photo-electric direction defining means to follow the weft threads by controlling the rotational movement of the photo-electric direction defining means in response to the angular deviation representing signal, whereby the photo-electric direction defining means take up a position which is symmetrical relative to the position of the weft threads.

2. The method according to claim 1, comprising effecting said scanning by at least two scanning means, using a signal representing an angle within the range of +15° to −15° relative to said predetermined direction and simultaneously producing a control voltage which represents the angular position of said scanning means relative to said weft threads for controlling the position of said weft threads.

3. The method according to claim 2, comprising controlling said rotational movement of the scanning means so that the rotation of the scanning means is effected clockwise and counter clockwise within said range of +15° to −15° back and forth about said predetermined direction corresponding to a maximum value of said angular deviation representing signal.

4. An appartus for ascertaining and controlling the angular deviation of weft threads in moving webs of fabric from a predetermined position, comprising:
(a) light source means for illuminating the fabric to produce a light spot thereon,
(b) a rotatably supported scanning means,
(c) photo-electric sensing means mounted on said scanning means,
(d) a drive means operatively connected to said scanning means for rotating the scanning means back and forth in clockwise and counter clockwise direction,
(e) control means electrically connected to said photo-electric sensing means for energizing said drive means, and
(f) voltage generating means response to the rotational position of said scanning means for producing a control voltage which represents the angular position of said scanning means relative to said weft threads for controlling the position of said weft threads.

5. The apparatus according to claim 4, wherein said scanning means comprise a disk with two longitudinal slits therein arranged in a V-shape to include an angle between each other.

6. The apparatus according to claim 5, wherein said photo-electric sensing means comprise two photocells, one photocell being mounted in a fixed position along and above one of said slits while the other photocell is mounted in a fixed position along and above the other slit.

7. The apparatus according to claim 5, wherein said photo-electric sensing means comprise a single photocell arranged above said slits and a swingable member arranged to direct light onto said single photocell.

8. The apparatus according to claim 7, wherein said single photocell is an elongated photocell and wherein said swingable member is a tiltable mirror arranged to reflect light onto said elongated photocell.

9. The apparatus according to claim 7, wherein said single photocell has an area surface, and wherein said swingable member is a swingable shutter having two slits therein arranged for alternate cooperation with the slits in the scanning disk.

10. The apparatus according to claim 4, wherein said photo-electric sensing means comprise a single photocell and a pivotable bar with a longitudinal slit therein, said photocell being mounted on said bar above the slit, said bar being swingable back and forth about a pivot point and above an aperture in said scanning means.

11. The apparatus according to claim 4, wherein said photo-electric sensing means comprise a single photocell, and wherein said scanning means comprise a single slit, said photocell being mounted in fixed position above the slit, said slit and photocell being movable in unison by said drive means.

12. The apparatus according to claim 4, wherein said photo-electric sensing means are mounted on said scanning means on one side of the fabric opposite said light source means so that the fabric may pass between the light source means and the photo-electric sensing means.

13. The apparatus according to claim 4, wherein said photo-electric sensing means comprise two photocells which are mounted at an angle relative to each other on said scanning means and on the same side of the fabric on which the light source means are located, said photocells being oriented in such a manner that both photocells view said light spot.

14. The apparatus according to claim 4, wherein said control means comprise a series resistor arrangement connected to said control means and to said voltage generating means for counteracting delays in the control.

15. The apparatus according to claim 4, wherein said control means comprise an electrical circuit arrangement connected to said photo-electric sensing means for differentially combining the signals produced by said sensing means, and a polarized relay connected in said circuit arrangement for energizing said drive means.

16. The apparatus according to claim 4, wherein said control means comprise a relay and relay contact circuit arrangement and semiconductor means for connecting the circuit arrangement to said photo-electric sensing means, said circuit arrangement being adapted for energizing said drive means in one or in the opposite direction in response to the rise and fall of the signal produced by the photo-electric sensing means.

17. The apparatus according to claim 7, comprising a solenoid and a tension spring connected to said swingable member for moving the swingable member back and forth in response to energizing and de-energizing of said solenoid.

18. The apparatus according to claim 10, comprising a solenoid and a tension spring connected to said pivotable bar for pivoting the bar back and forth above said aperture in response to energizing and de-energizing of said solenoid.

19. The apparatus according to claim 4, wherein said photo-electric sensing means comprises an oscillating photocell, a self-excited, oscillating member including an armature, said photocell being mounted to said armature, a switch operatively connected to said oscillating armature, and a relay circuit having said switch connected therein for opening and closing said relay circuit in response to the oscillating back and forth movement of said armature.

20. The apparatus according to claim 19, wherein said control means comprise two signal analyzing channels, a flip-flop contact and a relay in said relay circuit, said flip-flop switch connecting said signal channels alternately to the oscillating photocell in response to the energization of the relay in said relay circuit by said switch, said signal channels comprising means for energizing in two opposite drive directions said drive means of the scanning means.

References Cited
UNITED STATES PATENTS

| | | | |
|---|---|---|---|
| 2,209,220 | 7/1940 | Berry | 250—219 X |
| 3,024,986 | 3/1962 | Strianese et al. | 250—236 X |
| 3,193,688 | 7/1965 | Morton et al. | 250—219 |
| 3,278,750 | 10/1966 | Essfeldt | 250—236 X |
| 3,308,658 | 3/1967 | Bryan | 73—159 |

WALTER STOLWEIN, Primary Examiner

U.S. Cl. X.R.

26—51.5; 250—236; 356—238